United States Patent [19]

Vaninetti et al.

[11] Patent Number: 5,125,736
[45] Date of Patent: Jun. 30, 1992

[54] OPTICAL RANGE FINDER

[75] Inventors: Roy A. Vaninetti; John R. Coleman, both of Palm Bay, Fla.

[73] Assignee: Harris Corporation, Melbourne, Fla.

[21] Appl. No.: 611,656

[22] Filed: Nov. 13, 1990

[51] Int. Cl.⁵ .............................................. G01C 3/08
[52] U.S. Cl. ........................................ 356/5; 342/86; 342/103
[58] Field of Search ....................... 356/5; 342/86, 103

[56] References Cited

U.S. PATENT DOCUMENTS

| 3,778,160 | 12/1973 | Wolcott | 356/5 |
| 4,176,954 | 12/1979 | Bouillie et al. | |
| 4,413,905 | 11/1983 | Holzapfel | |
| 4,443,107 | 4/1989 | Alexander et al. | |
| 4,895,441 | 1/1990 | Allen | 356/5 |

OTHER PUBLICATIONS

G. M. S. Jones et al. Optics & Laser Tech., Aug., 1985, p. 169.

Primary Examiner—Stephen C. Buczinski
Attorney, Agent, or Firm—Evenson, Wands, Edwards, Lenahan & McKeown

[57] ABSTRACT

An optical range finder includes two detectors for minimizing frequency dispersion affects of the detectors on the system. The optical range finder is calibrated by locking a voltage controlled oscillator onto adjacent null modulation signal frequencies and determining a calibration time for each adjacent frequency. Once the calibration time is determined, the range finder transmits its modulated light signal to a target device and back. The signal reflected back is detected and a measurement time delay is calculated for each of the adjacent modulation signal frequencies. From these measurements, the actual distance between the target and the device can be calculated. The multiple frequency measurements allows for statistical averaging of random errors in the system.

14 Claims, 1 Drawing Sheet

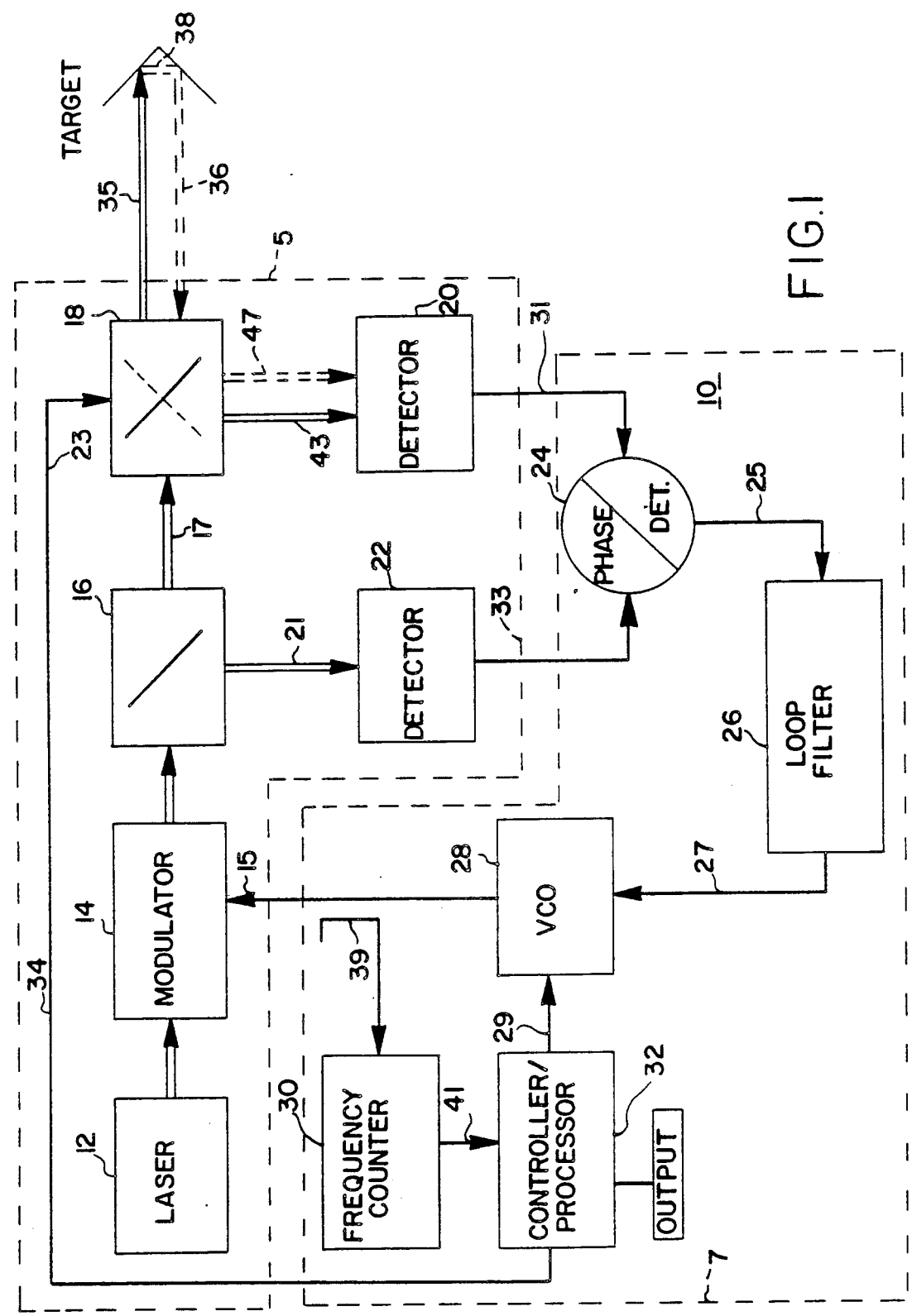

OPTICAL RANGE FINDER

This invention was made with Government support under a proprietary Government contract, The Government has certain rights in this invention.

BACKGROUND AND SUMMARY OF THE INVENTION

This invention relates to electronic distance measuring systems and, more particularly, to an optical range finder for providing precise distance measurements.

Electronic distance measuring equipment is well known and used in a variety of applications, such as for land surveying, map making or wherever measurements of difficult and/or inaccessible locations are required, such as for satellites or use in space. The distance measuring equipment can be applied to use in space for structural dynamic control, measurement of satellite closing distances for docking systems, deployment of antenna structures to precise distances, and other related concepts.

One known type of electronic distance measuring device transmits electromagnetic wave energy toward a target and detects the reflected energy The phase difference between the transmitted and reflected energy is determined and used to calculate distance. This type of "remote sensing" system includes the use of interferometry.

The interferometry techniques utilize a continuous wave optical signal generated by single frequency/coherence in laser devices. A simple technique combines the reflected optical beam with a source reference beam to produce a fringe pattern in which the phase shifts in the propagation path can be "counted". However, for large displacements, the continuous wave optical techniques become error-prone caused by missed counts. These missed count errors are fatal to the system requiring a complete recalibration procedure.

Another known optical range finder described in U.S. Pat. No. 3,778,160 transmits light energy from one location to another and has it reflected back towards the transmitting location. The energy is detected and compared in-phase with the transmitted energy. The phase relationship between the transmitted and detected energy is varied until a predetermined phase relationship exists. The frequency of the transmitted wave energy is then varied until a predetermined phase relationship exists at a different frequency. The difference in frequencies may then be utilized to provide a direct digital display of distance between the predetermined locations. However, this known system operates by performing only two frequency measurements. Therefore, no accounting is made for frequency dispersion errors which occur in the system. For example, phase detector drift, optic detector drift, and any path length drift cannot be accounted for. Further, the two frequencies measured are generated via separate voltage-controlled oscillators which themselves are subject to differential tracking errors.

There is therefore needed an optical range finder which accounts for frequency dispersion errors arising in the system. Further, the system should be capable of calibrating the internal time delay using the difference in frequency between adjacent frequencies.

The present invention meets these needs by providing an optical range finder having a modulated laser with a modulating oscillator frequency locked to a frequency dependent on a calibrated time delay. The laser source illuminates a target device and the time delay introduced into the system causes the frequency of the modulating oscillator to shift. The amount of frequency shift is proportional to the time delay. From this relationship, the precise distance to the target can be calculated.

It is an advantage of the present invention to perform multiple frequency measurements at a multiple number of different frequencies. This allows measurement averaging to occur over different frequencies to eliminate dispersion problems in the system. Further, the system is precalibrated prior to each measurement to eliminate distance drift errors.

It is another advantage of the present invention to provide an optical range finder which can measure distances on the order of 100 feet with a precision of 0.001 inches. The difference in frequency between adjacent lock points of the phase lock loop control system allows for calibration of the internal time delay in the system. By performing multiple measurements, the dispersion of the system's detectors can be characterized to improve the accuracy of the measurements.

The optical range finder of the present invention operates to measure distance by determining the frequencies at which the phase lock loop of the system produces integral number of wavelengths over the round trip distance traveled by the light energy, i.e. from the optical range finder to the target location and back. Any two adjacent frequencies will have only a one wavelength difference. The optical range finder measures the difference between adjacent frequencies, thus eliminating the need to know the absolute number of wavelengths between the optical range finder and the target.

It is a further advantage of the invention to provide an optical range finder operating in both a calibration and measurement mode. In both modes, the optical range finder's control system locks the laser modulating signal to a frequency which produces phase quadrature at the phase detector inputs. In the calibration mode, several adjacent frequencies are measure and the calibration time delay is calculated for each pair of frequencies. This provides a plot of the detector characteristics over the frequency range. In the measurement mode, the modulated laser light signal travels to the target device and back causing the lock frequency spacing to change. Several adjacent frequencies are measured and the measurement time delay is then calculated using the corresponding calibration time delay for the particular frequency.

In this system, two detectors are utilized to minimize the frequency dispersion effects. A separate detector is used to provide the reference signal rather than using the modulating signal as a reference. Further, at the lock frequencies, the phase detector is always at the same fixed operating point. This technique removes the phase detector non-linearity errors. Also, multiple frequency measurements made by the system allows statistical averaging to occur for minimizing random errors in the system.

Other objects, advantages and novel features of the present invention will become apparent from the following detailed description of the invention when considered in conjunction with the accompanying drawings.

BRIEF DESCRIPTION OF THE DRAWINGS

FIG. 1 is a functional block diagram of an optical range finder according to the present invention.

DETAILED DESCRIPTION OF THE DRAWINGS

Referring to FIG. 1, the optical range finder includes a transmitter/receiver unit 5 coupled with a phase lock loop unit 7. The transmitter/receiver unit 5 includes a transmitter source 12 which provides a coherent wave energy signal, such as an optical light signal from a laser source, to a modulator unit 14. From the modulator unit 14, a modulated light signal is provided to a beam splitter 16 which directs the modulated light signal to both an optical beam switch 18 and a first detector 22 as indicated by lines 17 and 21, respectively.

The optical beam switch 18 is controlled by an input 23 for switching the modulated light signal received from the beam splitter 16 to either a target device 38 or a second detector 20 as indicated by arrow 43. When the modulated light signal is transmitted to the target device 38, as indicated by solid arrow 35, it is reflected back toward the optical beam switch 18 as indicated by dashed line 36. This reflected light signal is then directed toward the second detector 20 as indicated by dashed line 47. The output of detectors 20 and 22 is provided to the phase lock loop unit 7.

The laser source 12, modulator 14, beam splitter 16, optical beam switch 18, and detectors 20 and 22 are all conventional devices. For example, the laser source 12 may be any continuous wave laser which generates a beam of radiant wave energy such as a gallium arsenide (GaAs) laser. The modulator unit 14 modulates the laser light signal in accordance with its modulating input signal 15 received from the phase lock loop unit 7. The detectors 20 and 22 can be, for example, semiconductor-type photo diode detectors that convert the optical light signal into an electrical signal which is provided to the phase lock loop unit 7.

The phase lock loop unit 7 includes a voltage-controlled oscillator 28 which provides the modulating signal as the input to the modulator unit 14 of the transmitter/receiver unit 5. The voltage-controlled oscillator 28 receives inputs via signal paths 29 and 27 from a controller/processor 32 and loop filter 26, respectively. The loop filter 26 is coupled between the voltage-controlled oscillator 28 and a phase detector 24. The phase detector 24 receives the detectors' 20, 22 output signals as indicated by arrows 31 and 33. The phase detector 24, loop filter 26 and voltage-controlled oscillator 28 form a phase-lock loop for controlling the transmitter/receiver unit 5 in accordance with the controller/processor unit 32. A frequency counter 30 receives an input derived from the modulating signal 15 from the voltage controlled oscillator 28. The input can be derived using, for example, a directional coupler 39, a power divider, etc. The frequency counter provides an input 41 to the controller/processor 32.

In operation, the voltage-controlled oscillator 28 provides a modulating signal input 15 to the modulator unit 14. The laser light signal emanating from laser source 12 is then modulated accordingly and fed to the beam splitter 16. The beam splitter 16 splits the light signal into two paths, as indicated by arrows 17 and 21. The path 21 is provided to the reference detector 22 while the other path 17 is provided to optical beam switch 18. The optical beam switch 18 may be formed of a two-position mirror which either reflects the light signal to the second detector 20 over path 43 or allows the light signal to travel toward the target 38. The target 38 reflects the light signal back to the two-position mirror beam switch 18 which reflects the signal to the second detector 20 over path 47.

Both outputs from detectors 20 and 22 are provided as indicated via arrows 31 and 33, respectively, to the phase detector 24. The phase detector 24 generates an error voltage which is necessary to frequency lock the voltage-controlled oscillator 28. The frequency is dependent upon the delay path 17 introduced between the optical devices 16 and 18. The error voltage from the phase detector 24 is provided to a loop filter 26 for filtering noise errors from the signal before being provided as an input 27 to the voltage-controlled oscillator 28.

The optical range finder of the present invention operates in both a calibration and a measurement mode. In the calibration mode, the voltage-controlled oscillator 28 is locked to two adjacent null frequencies in accordance with the controller input 29. The optical beam switch 18 is controlled by the controller signal 34 to pass the signals received from the modulator 14 via the beam splitter 16 to the second detector 20. The delay introduced by path 17 o frequency difference between the two null frequencies is measured and the calibration time (tcal) is calculated by the controller/processor 32 according to the equation:

$$t_{cal} = 2\pi / WDIFF \qquad (1)$$

wherein WDIFF equals the difference frequency measured by the frequency counter 30. This operation is repeated for several adjacent null frequencies, and a calibration time $t_{cal}$ for each frequency is calculated. In this manner, the frequency dispersion in the detectors 20 and 22 can be approximated versus the voltage-controlled oscillator 28 input frequency 15 to modulator unit 14.

After the calibration process is completed, which, for example, may take on the order of one second, the controller/processor 32 provides a control input signal 34 to the optical beam switch 18 to allow the modulated light signal to travel to the target 38 and back to the transmitter/receiver unit 5. Again, several adjacent null frequencies are measured using the reflected light signal which impinges on the second detector 20. This provides additional points to further characterize the frequency dispersion of the detectors 20 and 22. The additional time delay or phase length ($t_{meas}$) incurred via the light signals traveling the distance to be measured "D" and back can be calculated via the equation:

$$WDIFF = 2\pi / (t_{cal} + t_{meas}). \qquad (2)$$

Solving Equation (2) for the measurement time delay $t_{meas}$, gives:

$$t_{meas} = (2\pi / WDIFF) - t_{cal}. \qquad (3)$$

The calibration time $t_{cal}$ that corresponds to the measurement frequencies is then used to reduce the dispersion effects of the detectors 20 and 22. Once the measurement time delay $t_{meas}$ is known, then the actual distance "D" can be calculated accordingly:

$$(2)(D) = (C)(t_{meas}) \qquad (4)$$

wherein D equals the distance to be measured and C equals the velocity of light. Solving Equation (4) for the distance "D" gives $$D = \frac{(C)(t_{meas})}{2} \quad (5)$$

Accordingly, the distance "D" can be accurately measured with a precision on the order of 0.001 inches using the optical range finder. This system has the advantage of using two detectors 20 and 22 to minimize the frequency dispersion effects of the system. A separate reference detector 22 provides the reference signal instead of the conventional method of using the modulating signal itself. Further, at the lock frequencies of the phase-lock loop, the phase detector 24 is always at the same fixed point. This removes non-linearity errors in the phase detector 24 itself. Also, by allowing for multiple frequency measurements, statistical averaging of the random errors can occur to provide a high-precision distance measurement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An optical range finder for determining distances between two locations, having both a calibration and a measurement mode comprising:
   an optical source for generating an optical signal;
   a modulator receiving said optical signal and providing a modulated output signal;
   a voltage controlled oscillator circuit providing a modulating signal to said modulator;
   a beam splitter for splitting said modulated output signal into a reference signal and a transmission signal;
   a reference detector at a first location receiving said reference signal and generating a first detector signal;
   a second detector at said first location;
   an optical beam switch coupled between said beam splitter and said second detector operable to switch said transmission signal directly to said second detector in the calibration mode and indirectly via the second location in the measurement mode, said second detector generating a second detector signal in both modes;
   a phase detector receiving as inputs the first and second detector signals and generating an error signal to frequency lock said voltage controlled oscillator to a null frequency; and
   means for controlling and processing, coupled to said voltage controlled oscillator and said optical beam switch, said controlling and processing means operating the optical range finder to generate several adjacent null frequencies in both the calibration and measurement modes and determining calibration time delays for the adjacent null frequencies in the calibration mode and measurement time delays for the adjacent null frequencies in the measurement mode, wherein said controlling and processing means calculates the distance between two locations based on said calibration and measurement time delays.

2. An optical range finder according to claim 1, wherein said optical source is a laser.

3. An optical range finder according to claim 2, wherein said reference and second detectors are photo diode detectors generating electrical detector signals from the received optical reference and transmission signals.

4. An optical range finder according to claim 1, further comprising:
   a loop filter coupled between said phase detector and voltage controlled oscillator;
   a frequency counter coupled to said controller; and
   means for coupling said modulating signal to said frequency counter, said frequency counter measuring a difference frequency.

5. An optical range finder according to claim 4, wherein said optical beam switch is a two-position mirror.

6. A method for operating an optical range finder transmitting modulated wave energy from one location to another, the modulated wave energy being reflected back to said one location, to measure distances between the two locations, the method comprising the steps of:
   a) calibrating the optical range finder to determine calibration time delays for several adjacent null frequencies between two internal optical paths;
   b) measuring several adjacent null frequencies of the reflected modulated wave energy from one of said locations to determine measurement time delays for several adjacent null frequencies; and
   c) calculating the distance between the two locations based on the measurement time delays of the adjacent null frequencies and the calibration time delays for the corresponding adjacent null frequencies.

7. A method according to claim 6, wherein the step of calibrating, comprises the steps of:
   d) locking a voltage controlled oscillator to generate two adjacent null frequencies;
   e) measuring a difference frequency between said two adjacent null frequencies;
   f) repeating steps (d) and (e) for the several adjacent null frequencies, and
   g) calculating the calibration time delay for each of said adjacent null frequencies.

8. A method according to claim 7, wherein the step of calculating the calibration time delay is carried out according to the equation:
   $t_{cal} = 2\pi/\text{WDIFF}$, wherein $T_{cal}$ is the calibration time delay and WDIFF is the difference frequency between two adjacent null frequencies.

9. A method according to claim 7, wherein the step of measuring several adjacent null frequencies of the reflected modulated wave energy comprises the steps of:
   h) locking said voltage controlled oscillator to generate two adjacent null frequencies of the reflected modulated wave energy;
   i) measuring the difference frequency between said two adjacent null frequencies of the reflected modulated wave energy;
   j) repeating steps (h) and (i) for the several adjacent null frequencies of the reflected modulated wave energy; and
   k) calculating the measurement time delay for each of said adjacent null frequencies of the reflected modulated wave energy according to the equation:

$t_{meas} = (2\pi/WDIFF) - t_{cal}$, wherein $t_{meas}$ is the measurement time delay.

10. A method according to claim 9, wherein the step of calculating the distance is carried out according to:

$D = (C)(t_{meas})/2$, wherein D equals the distance and C equals the velocity of light.

11. A method for operating an optical range finder to measure distances between two locations, the method comprising the steps of:

generating a modulating frequency signal to modulate optical wave energy;

splitting the modulated optical wave energy into a reference signal and a transmission signal;

coupling said transmission signal to an optical beam switch for directing said transmission signal, said optical beam switch directing said transmission signal to a second detector at said first location when in a calibration mode and to a second location in a measurement mode, said transmission signal reflected from said second location being redirected by said optical beam switch to said second detector in the measurement mode;

detecting said reference signal at a first detector at a first location and generating a first detector signal;

generating a second detector signal from the second detector in both the calibration and measurement modes;

operating a phrase-lock loop receiving said first and second detector signals as inputs and nulling said modulating frequency signal at several adjacent null frequencies for both the calibration and measurement modes;

calculating a calibration time delay from said first and second detector signals in the calibration mode for each of said adjacent null frequencies;

calculating a measurement time delay from said first and second detector signals in the measurement mode for each of said adjacent null frequencies; and calculating the distance between the two locations using said calibration time and measurement time delays.

12. A method according to claim 11, wherein the step of calculating a calibration time delay is carried out according to the equation:

$t_{cal} = (2\pi/WDIFF)$, wherein WDIFF is the difference frequency between two adjacent null frequencies.

13. A method according to claim 12, wherein the step of calculating a measurement time delay is carried out according to the equation:

$$t_{meas} = (2\pi/WDIFF) - t_{cal}.$$

14. A method according to claim 13, wherein the step of calculating the distance is carried out according to the equation:

$D = (C)(T_{meas})/2$, wherein D equals the distance and C equals the velocity of light.

* * * * *